United States Patent
Lefevere

[11] Patent Number: 6,014,402
[45] Date of Patent: Jan. 11, 2000

[54] ELECTRIC RESISTANCE MELTING FURNACE

[75] Inventor: Luc Lefevere, Sint-Kruis, Belgium

[73] Assignee: Bayer Aktiengesellschaft, Germany

[21] Appl. No.: 09/100,039

[22] Filed: Jun. 19, 1998

Related U.S. Application Data

[63] Continuation of application No. PCT/EP96/05516, Dec. 11, 1996.

[30] Foreign Application Priority Data

Dec. 21, 1995 [DE] Germany .......................... 195 48 027

[51] Int. Cl.⁷ ..................................................... H05B 3/62
[52] U.S. Cl. ................................. 373/118; 373/3; 373/20
[58] Field of Search ..................................... 373/3, 18, 19, 373/20, 109, 115, 116, 118, 122, 123, 137

[56] References Cited

U.S. PATENT DOCUMENTS 2,008,495 7/1935 Ferguson .
2,250,155 7/1941 Ferguson .

FOREIGN PATENT DOCUMENTS

| 019645 | 12/1980 | European Pat. Off. . |
| 071110 | 7/1982 | European Pat. Off. . |
| 231516 | 3/1990 | European Pat. Off. . |
| 357053 | 3/1990 | European Pat. Off. . |
| 2151896 | 4/1972 | Germany . |
| 3824829 | 1/1990 | Germany . |

*Primary Examiner*—Tu Ba Hoang
*Attorney, Agent, or Firm*—Baker & Botts, L.L.P.

[57] ABSTRACT

The invention relates to an electric resistance melting furnace for vitrifiable compositions, such as glass, enamel or ceramics, with a rotatable melting tank (1) about the vertical axis and a stationary upper furnace (4), which can be operated intermittently or continuously and permits a rapid and clean product change.

9 Claims, 2 Drawing Sheets

ELECTRIC RESISTANCE MELTING FURNACE

This application is a continuation application of International application PCT/EP96/05516, filed Dec. 11, 1996, designating the U.S., which claimed priority from German Application No. P19 548 027.9, filed Dec. 21, 1995.

BACKGROUND OF THE INVENTION

1. Field of the Invention

The invention relates to an electric resistance melting furnace for vitrifiable compositions, such as glass, enamel or ceramics, with a rotatable melting tank and a stationary upper furnace, which can be operated intermittently or continuously with a "cold top" cover and permits a rapid and clean product change.

2. Description of the Related Art

Various types of heating furnace which differ in, inter alia, the form of energy which is used are employed in the glass, enamel and ceramic industries for melting vitrifiable compositions. For example, gas-heated or electrically heated furnaces are used in parallel, the economic efficiency of these in each case being determined by their energy consumption, by the quantity and composition of their waste gases and by their flexibility with regard to a product change. The known furnaces have until now only met selected criteria relating to a narrow circle of products to be treated.

There is, however, interest in a type of furnace which permits a frequent change of product, while keeping losses in terms of raw material to a minimum, yet which also permits flexible operating conditions which in turn enable a wide range of products to be processed.

Generally speaking, the types of melting furnace used for vitrifying raw materials are distinguished according to the type of energy supply. For example, furnaces with radiant heating through flames or electric radiant elements have become known, as have those which operate by direct heating on a reverberatory basis (see, for example, EP 71 110).

Furnaces as described in EP 71 110 use a batch layer at the lining in order to prevent the latter from sustaining damage due to the heat of the flames.

Since it is impossible to prevent damage to the lining in the above-mentioned types of furnace due to gaps in the outer batch layer and the thermal load, in spite of being vertically rotatable, specific expenditure is additionally employed for separate cooling or a refractory lining in recent developments (see, e.g. EP 231 516 B1).

Those electrically heated melting furnaces which have resistance heating, flame arc heating or induction heating have in particular gained importance. An electric resistance melting furnace has been described, for example, in the patent specification DE 38 24 829. Electric resistance furnaces and similar furnace types can be operated with an open melting bath or even with a melting bath covered with solid raw materials, a so-called "cold top" cover. The melting tanks which are covered with raw material require a complex raw material charging machine in order to ensure that the raw material cover is composed in a uniform manner.

The known electric resistance melting furnaces have a stationary tank with fixed heating electrodes and are optimised in terms of structure and geometry in line with a certain product. Furnaces of this kind are usually conceived for long-term, continuous operation without a product change-over.

SUMMARY OF THE INVENTION

There is, however, interest in a type of furnace which permits a frequent change of product, while keeping losses in terms of raw material to a minimum, yet which also permits flexible operating conditions which in turn enable a wide range of products to be processed.

The object of the invention was to develop a type of furnace which, as described, operates without regard to the product type. The furnace is to operate as a resistance melting furnace and permit the so-called "cold top" mode.

The object is solved according to the invention by an electric resistance melting furnace for vitrifiable compositions which comprises at least one melting tank, a stationary upper furnace, roof electrodes, a chimney connection, a preheater for the furnace charge, a charging unit and an outlet for the melt and which is characterised in that the melting tank is mounted such that it can rotate about a vertical axis, and that the upper furnace and the melting tank can be separated from one another in the vertical direction.

Because the melting tank and the upper furnace can be separated from one another, the tank can be replaced if worn to a significant degree with little expenditure of labour.

The melting tank comprises in particular a bottom drain via which the bath depth and the run-out speed of the melt can be regulated. The bottom drain preferably lies at the lowest point of the tank. All other necessary connections such as electrodes, charging unit or chimney connection are preferably provided at the stationary upper furnace.

In a further preferred embodiment the charging unit is formed as a worm conveyor whose delivery end can move radially to the rotational axis of the melting tank. Together with the rotation of the melting tank, this charging unit enables a closed batch cover over the melting bath to be produced. Areas having a relatively high fusion speed in the presence of a "cold top" cover can thus be specifically filled with a greater amount of starting batch in order to even out the melt cover.

The electrodes of the melting furnace are preferably formed such that they can each swivel about a vertical axis. The spacing between the electrodes and the spacing from the furnace wall can thereby be adjusted during continuous operation.

The electrodes are in particular formed such that they can move vertically and can be removed from the melting furnace. On the one hand, this variant of the melting furnace according to the invention enables the depths of penetration of the electrodes to be adapted to one another. On the other hand, the entire electrode group may also, if necessary, be removed from the melting furnace during continuous operation to enable maintenance to be carried out or individual electrodes to be replaced.

A particularly preferred embodiment of the invention comprises above the upper furnace a chamber which is resistant to high temperatures and which may be flooded with inert gas. Hot electrodes may be withdrawn into this chamber during a product change for protection against corrosion, e.g. due to ambient air. The chamber is flooded with inert gas if necessary.

In a further variant of the melting furnace according to the invention the electrode rods have an integrated cooling system, e.g. a water cooling circuit, which cools the electrodes to below the surface of the melt if required.

The melting furnace according to the invention may in addition be provided with a generally known preheater. Either gas burners or electric resistance or radiant heating units may be used as preheaters.

The resistance melting furnace according to the invention can be used for vitrifying a wide variety of raw materials. It is just as suitable for producing glass or other silicate compounds as it is for producing enamel and ceramics or for vitrifying waste products.

The furnace is particularly suitable for outputs of 100 to 1000 kg/h if very different products have to be produced in small quantities, i.e. in short production runs, e.g. with batches of between 2 and 20 tonnes with frequent product changes.

The melting furnace according to the invention can be operated either continuously or intermittently. The melting furnace according to the invention only allows a small amount of unwanted infiltrated air to enter the melting furnace chamber from outside.

If the spacing of the electrodes can be varied in continuous operation, the resistance of the melting bath can be varied so as to enable the optimum operating current or optimum operating voltage to be set for each raw material mixture. The optimum operating current is achieved with a maximum input of energy into the melt without local overheating of the latter.

The level of the melt in the melting tank can be adapted to the respective dwell time of the furnace charge and the production speed by means of the preferred vertical electrode adjustment, e.g. with eccentric electrode geometry.

The diameter and the length of the electrodes can be varied in order to correspond to the optimum melt level.

The melting furnace may in particular be electrically started with minimum quantities of melt if the electrode height is adjustable.

As the depth of penetration of the electrodes can be adjusted during operation, the emission of heat and the spacing of the electrodes from the bottom can be optimised. The first melt is produced by, e.g. radiation when starting the furnace or completely emptying it (product change).

The melting tank of the melting furnace according to the invention is rotatably mounted. This results in optimum heat distribution in the melt. A further advantage lies in the very good delivery of energy from the electrode, which prevents local overheating of the melt, the electrodes and the furnace wall. This is important for product quality, electrode lifetime and the furnace wall, which is resistant to high temperatures.

The electric resistance melting furnace according to the invention has in particular the following advantages with respect to known melting furnace constructions.

The electrode geometry, which can be varied in continuous operation, permits a very high level of flexibility when melting a wide variety of raw materials.

The rotatably mounted melting tank, combined with the stationary roof electrodes, guarantees optimum temperature and heat distribution in the melt. The prevention of local overheating reduces the risk of the product, the electrodes and the refractory furnace lining undergoing uncontrolled physical and chemical processes.

Optimum bath coverage is achieved through the radially mobile charging worm together with the rotational movement of the tank. Should the raw material skin fuse unevenly, the cover can easily be corrected, as described, by means of this system. Any volatile matter escaping from the melt can as a result be retained in the best possible manner. This guarantees a constant product composition and an environmentally friendly melting process.

The amount of infiltrated air entering the furnace chamber is kept to a minimum by the charging worm concept.

In a preferred embodiment, in which the angle of inclination of the tank bottom increases in the direction of the outlet, the form of the tank permits a very good idle operation. Together with the electrodes rotating above the bottom, this prevents melt constituents from settling.

The favourable ratio between the bath cross section and the depth produces a definite piston flow. This improves the homogeneity of the melt.

The above-mentioned furnace geometry entails a small surface in relation to the volume. This results in a low heat loss and little specific wear.

The furnace is completely emptied when changing over from one product to another, so that only very slight contamination of the new product is to be expected when a change is made. The roof electrodes can be moved out of the furnace in order to prevent damage when producing the starting melt by means of radiant heating.

The tank can be easily and inexpensively replaced if there is a risk of contamination or for repair purposes.

BRIEF DESCRIPTION OF THE DRAWINGS

The invention is explained in detail by way of example in the following on the basis of the figures, in which.

DETAILED DESCRIPTION OF SOME PREFERRED EMBODIMENT OF THE INVENTION

Figure 1:
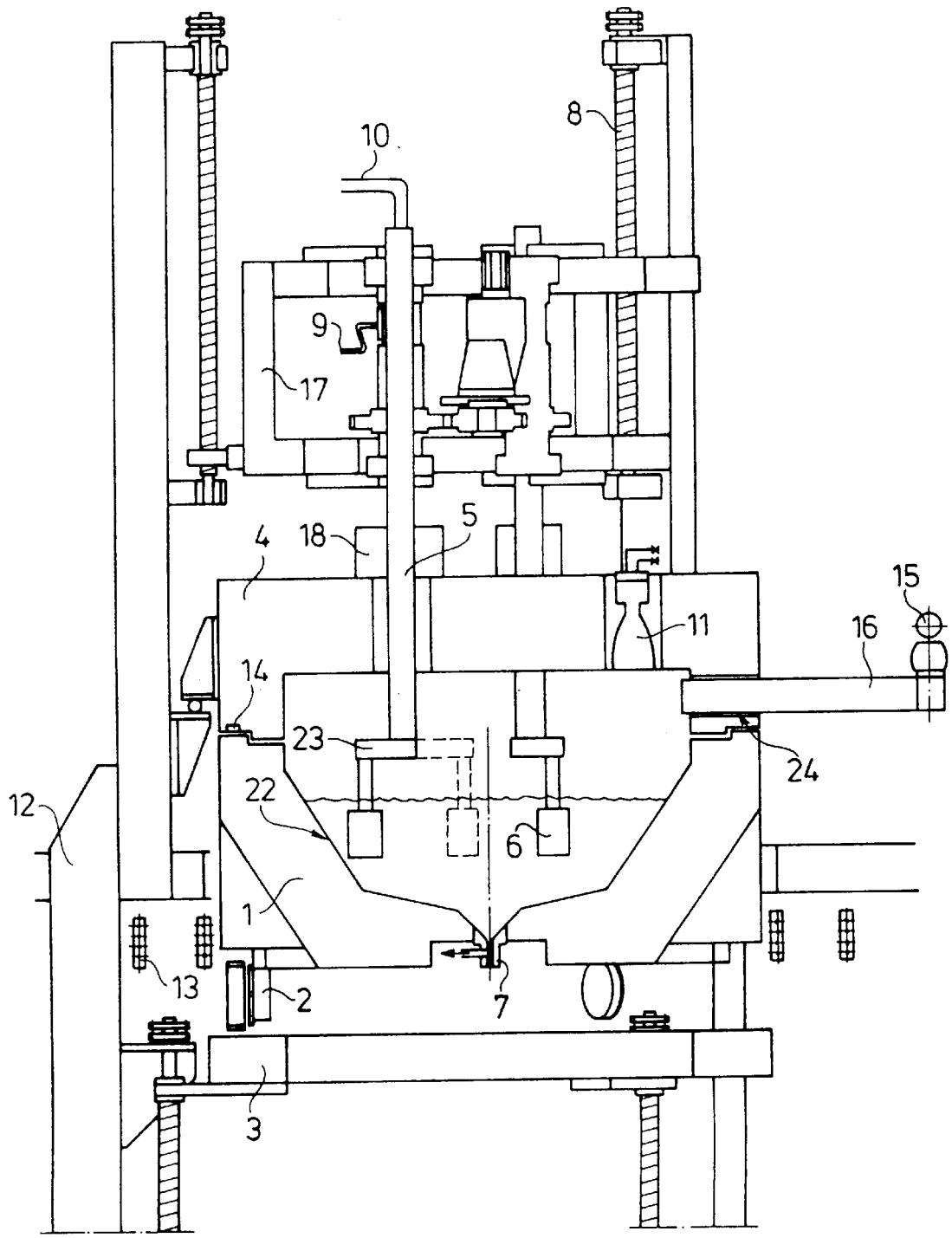
FIG. 1 is a diagrammatic cross section through a melting furnace according to the invention.

The tank 1, which rotates about the vertical axis, is supported by driven wheels 2 or a driven turntable. The walls 22 of the tank are lined with refractory material and insulated. The outside of the tank may also be cooled, so as to melt according to the "glass in glass" principle. An energy conduction chain 13 enables any media required to be supplied to the tank 1, which rotates to-and-fro for example. The tank is formed such that it can be lowered for repair purposes.

The upper furnace 4 is stationary and suspended from the steel construction 12. The following openings are provided in this part: passages for roof electrodes 5, 6, a chimney connection (not shown), the burner 11 for warming up the furnace or for producing the initial melt, observation holes, level meters and thermometers (not shown). An opening 24 for the mobile charging worm 16 is provided at the side of the melting furnace.

A seal 14 is provided between the stationary upper part 4 and the rotatable tank 1.

The electrode holders 5 are suspended in a rotatable manner in the frame 17, which can be raised and lowered. The cantilever 23 enables the electrodes 6 to execute a radial adjusting movement. The electrodes 6 move in synchronism. The three electrodes may be adjusted together in terms of height by means of a lifting device 8 in order to reach the optimum position in the melt. The electrodes 6 may also be withdrawn into the roof recesses 18, e.g. during a product change-over.

The electrodes are removed through the upper furnace 4 when replaced.

A power supply point 9 and a cooling water connection 10 are provided at each electrode holder. The electrode holder is cooled as far as the electrode 6. The size of the electrodes can be adapted to the melting conditions and the depth of the bath.

The radially mounted charging worm 16 can be inserted and pushed out via a longitudinal drive and longitudinal guides in the upper furnace. This worm 16 is connected via a flexible coupling 15 and a flexible worm (not shown) to a stationary raw material silo, which is not shown.

Figure 2:
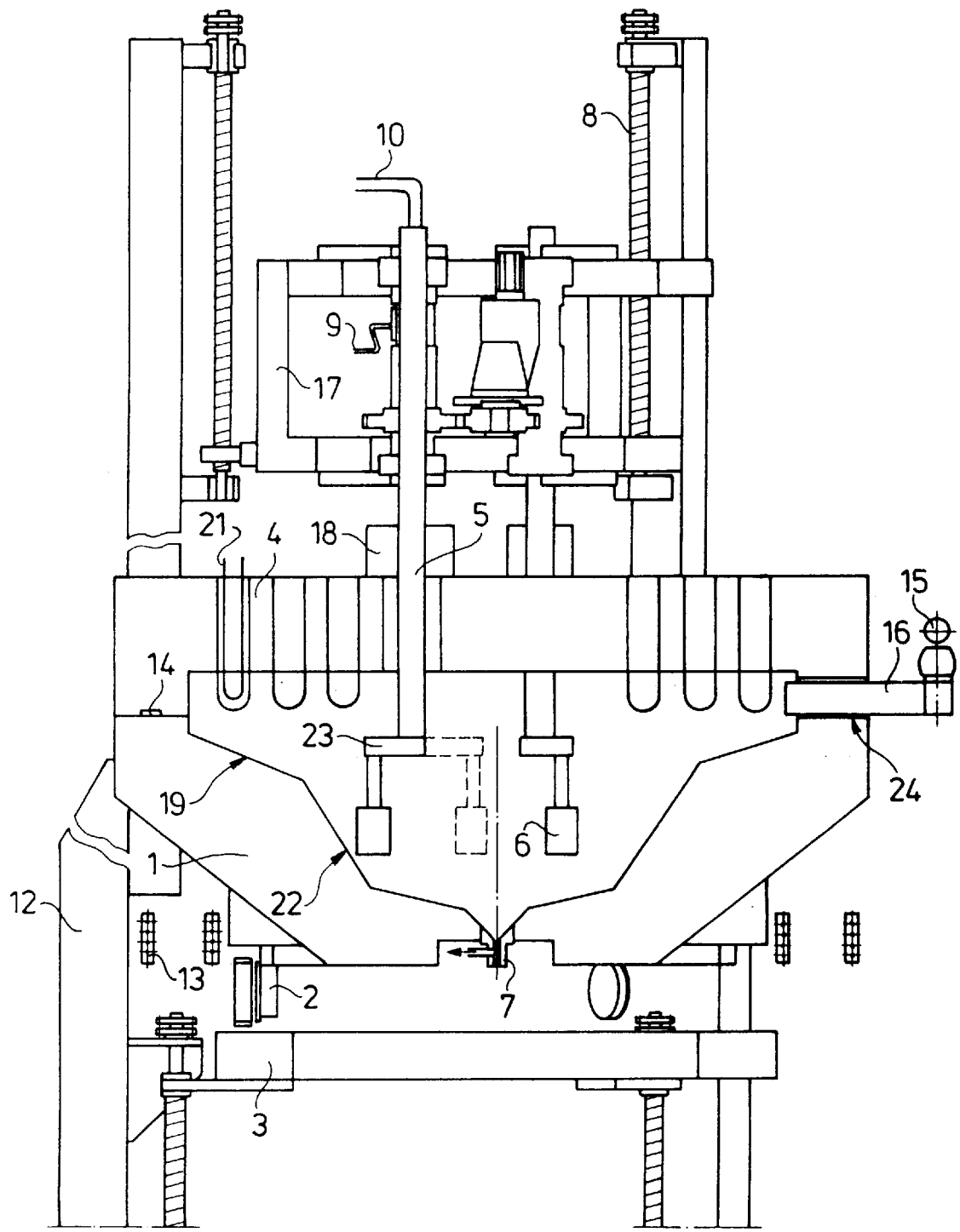
FIG. 2 is a variant of the furnace according to FIG. 1, with a radiant heating unit instead of a burner as the preheater.

FIG. 2 shows an alternative design to the resistance melting furnace according to FIG. 1. The burner 11 for warming up the furnace and for producing the initial melt is replaced by radiant tubes 21. In order to obtain a greater fusion area with radiant heating when starting the melting furnace, a concentric zone with a flatter bottom surface 19 is fitted in the tank 1. This ring surface 19 is covered with a thin layer by means of the radially mobile worm 16.

The cold melting furnace is brought to operating temperature by means of the radiant tubes 21 or a burner 11 according to FIG. 1. The outlet 7 is closed. The mobile worm 16 disperses raw materials onto the bank 19 or into the tank 1. The melt which is produced runs into the conical lower part of the tank 1. When sufficient melt has been produced, the electrodes 6 are immersed in the melt. The burner 11 or the radiant elements 21 is/are turned off. The raw materials are now spread over the uncovered melt and subsequently melted as "cold top" by resistance heating. The bath is now at a minimum level. As the level of the bath rises, the electrodes 6 are raised so as to reach the optimum level in the bath. When the tank is filled to maximum capacity the bottom outlet 7 is opened by a certain amount. From this point on an equilibrium between the input of raw material and the delivery of product is maintained.

When the product is changed over the level of the bath is lowered with or without a raw material cover and the electrodes are moved down. The changeover to a new raw material takes place after the lowest position has been reached. As a result, only a minimum quantity of transition product is produced.

It is also possible to change over to a different product without product loss by another method. The melt level and the electrodes 6 are lowered to the bottom position in this case as well. The electrodes are then withdrawn into the roof recesses 18. If necessary, the tank is emptied by means of the radiant tubes or the burners. The tank can then be refilled as already described above.

I claim:

1. An electric resistance melting furnace for a vitrifiable composition, comprising a melting tank (1) being mounted such that it can rotate about a vertical axis, a stationary upper furnace (4), electrodes (6) for the heating of the content of the melting tank (1), a chimney connection, a preheater (11) for the furnace charge, a charging unit (16) and an outlet (7) for the melt, characterized in that the stationary upper furnace (4) is provided with connections for the electrodes (6), and furthermore, characterized in that the upper furnace (4) and the melting tank (1) can be separated in a vertical direction.

2. The resistance melting furnace according to claim 1, characterized in that the melting tank (1) comprises a bottom drain (7) which can be regulated and which is in particular provided at the lowest point of the tank (1).

3. The resistance melting furnace according to claims 1 or 2, characterized in that the connections for the electrodes (6), the charging unit (16) or a chimney connection are provided at the stationary upper furnace (4).

4. The resistance melting furnace according to claims 1 or 2, characterized in that the charging unit (16) is formed as a worm conveyor whose delivery end can move radially to the rotational axis of the melting tank (1).

5. The resistance melting furnace according to claims 1 or 2, characterized in that the electrodes (6) of the melting furnace are formed such that they can each swivel about a vertical axis, in particular by means of a cantilever (23).

6. The resistance melting furnace according to claims 1 or 2, characterized in that the electrodes (6) can move vertically, can be removed from the melting furnace and adjusted in terms of height.

7. The resistance melting furnace according to claims 1 or 2, characterized in that the furnace comprises above the upper furnace (4) a chamber (18) which is resistant to high temperatures and which may be flooded with inert gas.

8. The resistance melting furnace according to claims 1 or 2, characterized in that the rods (5) of the electrodes (6) have an integrated cooling device which extends in particular to below the surface of the melt.

9. The resistance melting furnace according to claims 1 or 2, characterized in that the furnace is provided with an additional preheater (21), in particular a gas burner (11) or an electric resistance or radiant heating unit (21).

* * * * *